United States Patent [19]
Holmes et al.

[11] Patent Number: 6,020,997
[45] Date of Patent: Feb. 1, 2000

[54] FOLDING OPTICAL DEVICE SUCH AS BINOCULARS

[75] Inventors: Dean Lynton Holmes, East Ivanhoe; Eric Chin, St. Kilda East, both of Australia

[73] Assignees: Cire Innovation Pty Ltd; Design Development Group Pty Ltd, both of Victoria, Australia

[21] Appl. No.: 08/973,061

[22] PCT Filed: May 24, 1996

[86] PCT No.: PCT/AU96/00318

§ 371 Date: Feb. 12, 1998

§ 102(e) Date: Feb. 12, 1998

[87] PCT Pub. No.: WO96/37795

PCT Pub. Date: Nov. 28, 1996

[30] Foreign Application Priority Data

May 25, 1995 [AU] Australia .................................. PN3187

[51] Int. Cl.[7] .......................... G02B 23/18; G02B 23/20; G02B 27/04
[52] U.S. Cl. ............................................. 359/408; 359/474
[58] Field of Search ....................................... 359/408, 474

[56] References Cited

U.S. PATENT DOCUMENTS

| | | | |
|---|---|---|---|
| 567,890 | 9/1896 | Densmore et al. | 359/408 |
| 2,018,739 | 10/1935 | Pauchek | 359/474 |
| 4,268,111 | 5/1981 | Green et al. . | |
| 4,435,912 | 3/1984 | Adrian et al. | 40/365 |
| 4,454,669 | 6/1984 | Simmons . | |
| 4,913,538 | 4/1990 | Wakayama et al. | 359/408 |
| 5,000,543 | 3/1991 | Curtin . | |
| 5,058,990 | 10/1991 | Bush | 359/474 |
| 5,181,139 | 1/1993 | Benitez | 359/408 |
| 5,206,757 | 4/1993 | Cheng et al. | 359/408 |

FOREIGN PATENT DOCUMENTS

| | | |
|---|---|---|
| 1531731 | 11/1978 | United Kingdom . |
| 2112163 | 7/1983 | United Kingdom . |
| 2223603 | 4/1990 | United Kingdom . |

*Primary Examiner*—Jon Henry
*Attorney, Agent, or Firm*—Greer, Burns & Crain, Ltd.

[57] ABSTRACT

An optical device, preferably in the form of a pair of folding binoculars (10) includes a front support (12) with a first optical means in the form of a pair of front lenses (25). A second optical means in the form of a pair of rear lenses (27) are supported by a rear support (14). Both the front support (12) and the rear support (14) are pivotably mounted to a spacing means (16) extending between the front support (12) and the rear support (14). The supports (12,14) are pivotably mounted to the spacing means (16) about respective mounting edges (17,18). The supports (12,14) each have a free edge (20,22) located opposite the respective mounting edges (127,18), enabling the support (12,14) to be folded from an operative configuration to a storage configuration. The optical device (10) may also include a releasable holding means (35, 36, 37, 38, 39, 39a, 39b) to hold the front support and the rear support in the operative configuration. The binoculars (10) may be constructed by integrally moulding the first pair of lenses (25) into the front support (12) and likewise, integrally moulding the second pair of lenses (27) into the rear support (14).

21 Claims, 2 Drawing Sheets

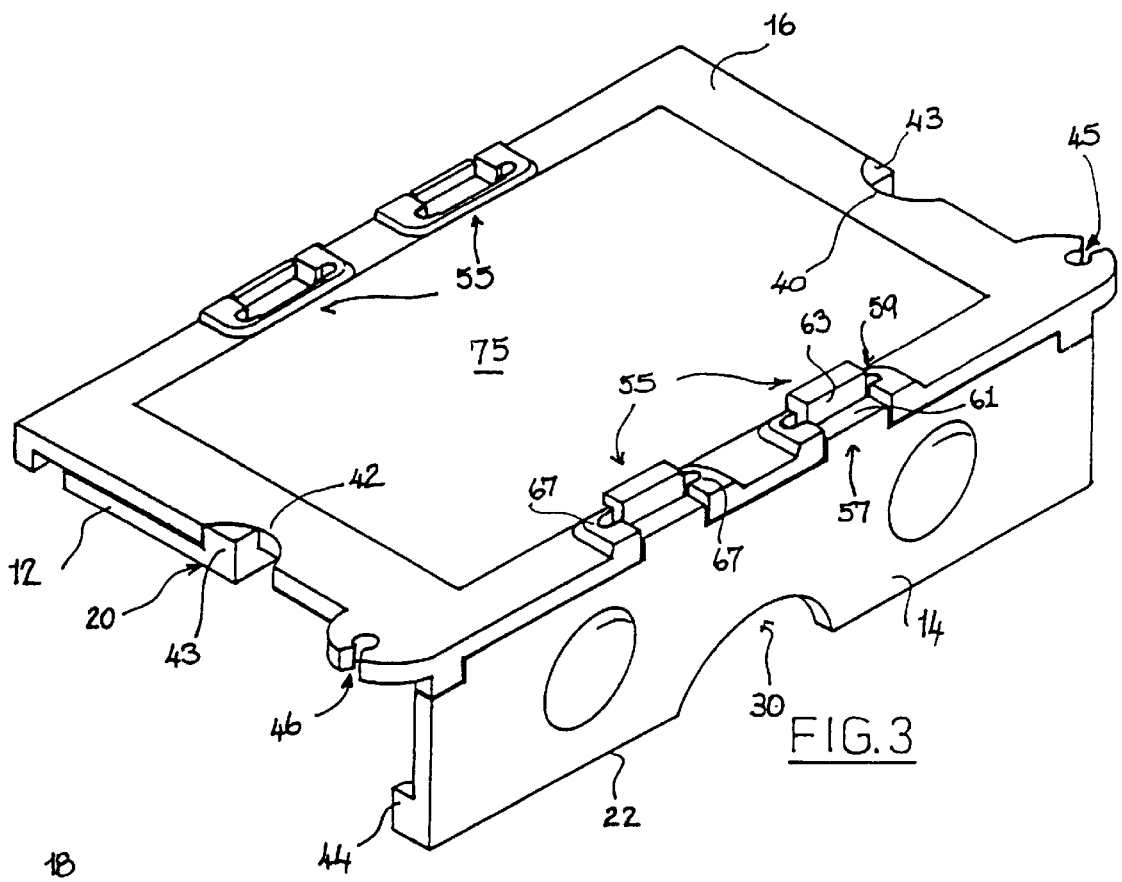
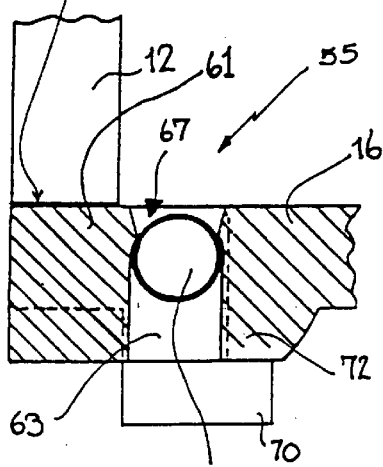
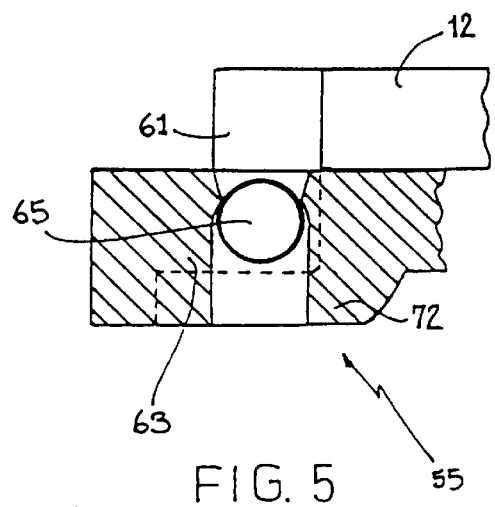

FOLDING OPTICAL DEVICE SUCH AS BINOCULARS

TECHNICAL FIELD

The present invention relates to at optical device such as binoculars. In particular, although not exclusively, the invention relates to binoculars of the type commonly known as field glasses or opera glasses to improve vision at sporting events and other public events in which the user is located some distance from the activity being observed. However, the invention is not restricted to binoculars and may be applied to a simple telescope or to other optical devices.

BACKGROUND ART

Several binoculars of the folding type are known and one such type is disclosed in Australian Patent Application No. 35049184. The binoculars are comprised or a front optical element and a rear optical element connected by a resilient structure which, when compressed, changes the focus of the optical elements. The resilient structure includes an upper folded wall extending from the top of the front optical element to the top of the rear optical element and a lower folded wall extending from the bottom of the front optical element to the bottom of the rear optical element. The structure also includes side panels. The entire structure can be folded flat by folding the upper wall onto itself and by folding the lower wall onto itself such that the front optical element is disposed on top of the rear optical element.

The main difficulty in using these binoculars is that they are difficult to hold so as to maintain the front and rear optical elements at a constant spacing. The resulting view for the user is one of ever-changing focus leading to poor vision and eye strain. Further, to fold the binoculars, the various walls and panels must be folded in a particular sequence to arrive at the properly folded configuration. This is tedious. Thus the binoculars produce an unsatisfactory result and are awkward to use.

An advance over the binoculars described above is disclosed in Australian Patent Application No. 72881/87 and similarly in U.S. Pat. No. 4,443,071. A one piece blank having a series of rectangular panels including a front optical panel and a rear optical panel may be assembled to form a foldable binocular. However, these binoculars also suffer from the disadvantage that since they are made up of folded parts, they are inclined to collapse onto themselves, making them difficult to hold and operate. These binoculars also suffer from the disadvantage that they are made up of a number of panels which must be folded in proper sequence about prescribed fold lines to disassemble the binoculars. This is inconvenient.

Moreover, the binoculars disclosed in all of the above-mentioned applications are designed to be constructed from thin semi-rigid material such as cardboard which would have a short life expectancy and not withstand wet conditions. Furthermore, the binoculars in their folded state have an appreciable amount of overlapping of the panels and as such the resulting foldable binoculars could tend to be bulky and not very flat.

It is therefore an object of the present invention to provide an improved optical device which overcomes or ameliorates the above-mentioned disadvantages.

DISCLOSURE OF INVENTION

In accordance with a first aspect of the present invention, there is provided an optical device including: a front support including a first optical means; a rear support including a second optical means; a spacing means extending between the front support and the rear support; the front support and the rear support having respective mounting edges, and being pivotably mounted to the spacing means at their respective mounting edges, each of the front support and the rear support having a free edge located opposite to the mounting edge, the front support and the rear support being foldable between a storage configuration and an operative configuration in which the first optical means and the second optical means are in substantial alignment.

Preferably, the spacing means will set the front and rear supports at a fixed distance relative to each other when they are in the operative configuration. Thus it is preferred that the spacing means is in the form of one or more substantially inflexible or rigid members extending between the front and rear supports. Such member(s) preferably define a common plane so that the device is compact and flat when the front and rear supports are folded into the storage configuration. In a preferred form of the invention, the spacing means is substantially continuous. For example, the spacing means may be in the form of a rectangular sheet-like or plate-like panel with the front and rear supports mounted at opposite side edges thereof. Having the spacing means in the form of a panel allows advertising material such as corporate sponsorship to be displayed on one or both sides thereof.

Preferably, the front and rear supports are also substantially rectangular and hingedly connected to the spacing means at their respective mounting edges. The rear support may include a pair of eye pieces such as a simple ocular lens and the front support may include a pair of objective lenses. The arrangement results in binoculars intended to operate according to the principal of a Galilean telescope providing approximately four times magnification. Suitably, the dimensions of the spacing means are such that the front and rear supports are set at a fixed spacing enabling operation as Galilean binoculars. The required spacing between the front and rear lenses is dependant on the curvature of the lenses. However, the invention is not restricted to operate according to the principle of a Galilean telescope and as such, the front and rear supports may include lens arrangements more complex than those described above.

Preferably the lenses in the front and rear supports are set to a standard pupil distance. The lenses may be moulded into the supports providing a permanent fixture for the lenses. According to a preferred embodiment of the invention, the lenses are integrally moulded with the front and rear supports to simplify the manufacturing process. For example, each support with its lenses may be molded from acrylic plastic in a single operation, with the portions surrounding the lenses being frosted.

Preferably, the sum of the maximum width of the front support from its mounting edge to its free edge and the maximum width of the rear support from its mounting edge to its free edge is less than the dimension of the spacing means between the front support mounting and the rear support mounting such that in the storage configuration, the front support and the rear support lie substantially against the spacing means in a common plane.

This arrangement wherein the front and rear supports fold flat against the spacing means will result in the optical device being substantially planar in the storage configuration and thus convenient for the user to carry. Preferably, each of the front and rear supports are approximately half the width of the spacing means between the mounting of the front and rear supports such that the free edges of the front and rear supports meet in the centre when in the storage configuration. The free edges of the front and rear supports may be of a complementary shape. For example, the free edge of the rear support may be provided with a rebated portion to accommodate the user's nose in use. Accordingly, a complementary protrusion may be provided along the free edge of the front support. A retention means may also be provided to releasably hold the front and rear supports in the storage configuration.

The mounting between the supports and the spacing means may be by way of a hinged connection. Alternatively, a flexible member may subsist between the spacing means and the supports to provide a hinged connection in the form of a leaf hinge. In the operative configuration, it is preferred that the supports extend perpendicularly to the spacing means. However, other angles slightly inclined to the perpendicular may also be acceptable. In one form of the invention, the supports rotate through ninety degrees from their storage configuration to their operative configuration. Alternatively, the front and rear supports may hinge through 270 degrees from their storage configuration to their operative configuration. In any case, a preferred arrangement is that the supports are adapted to swing into the operative positions such that they are dependant from the spacing means in use. This reduces the amount of sunlight entering the binoculars between the front and rear panels.

In accordance with a second aspect of the present invention, there is provided an optical device including:
  a front support including a first optical means;
  a rear support including a second optical means;
  a spacing means extending between the front support and the rear support;
  the front support and the rear support being pivotably mounted to the spacing means and foldable between a storage configuration and an operative configuration in which the first optical means are in substantial alignment with the second optical means; and
  further including a releasable holding means associated with each of the front support and the rear support to hold the front support and the rear support in the operative configuration.

The releasable holding means may be manually effected or the supports may be automatically retained in the operative position by a snap fitting. This snap fitting may be incorporated into the hinge. Limit means may also be provided to define the operative configuration of the supports.

In accordance with a third aspect of the present invention, there is provided binoculars including:
  a first pair of lenses provided in a front support;
  a second pair of lenses provided in a rear support;
  the front support and the rear support being constructed of plastic material wherein the first pair of lenses are integrally moulded with the front support and the second pair of lenses are integrally moulded with the rear support.

In accordance with a fourth aspect of the present invention, there is provided a method of making binoculars having a first pair of lenses provided in a front support and a second pair of lenses provided in a rear support, the method comprising:
  for each support, moulding the respective lenses at the same time as the support using the same material.

BRIEF DESCRIPTION OF DRAWINGS

In order that the invention may be more fully understood one embodiment will be described with reference to the figures in which:

FIG. 3 is a perspective view of the binoculars shown in FIG. 1 except shown from above;

FIG. 4 is a part sectional view through a hinge of the binoculars shown in the operative configuration; and FIG. 5 is a part sectional view through the hinge of FIG. 4 except shown in the storage configuration.

BEST MODE FOR CARRYING OUT THE INVENTION

Figures 1, 2:
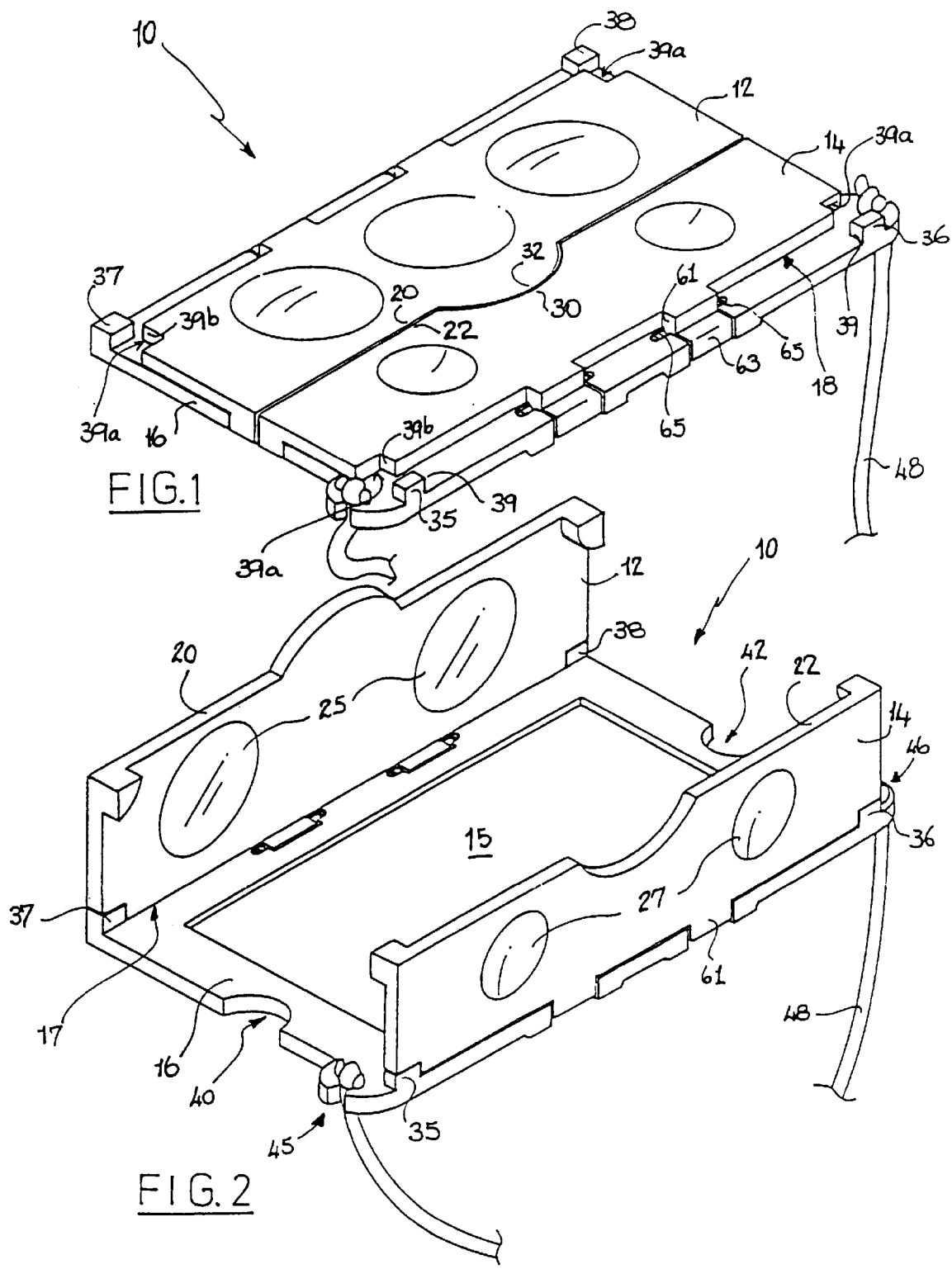
FIG. 1 is a perspective view of the underside of a preferred embodiment of a pair of folding binoculars, shown in a storage configuration.
FIG. 2 is a perspective view of the binoculars of FIG. 1 except shown in an operative configuration.

Referring to FIG. 2, the binoculars 10 comprise a front panel 12 and a rear panel 14 hinged to opposite side edges of a rectangular spacing panel 16. The proper orientation of the binoculars 10 in use is shown in FIG. 3. Reverting to FIG. 2, the spacing panel 16 has a rectangular shaped recess 15 centrally located on the underside of the spacing panel 16 to reduce the amount of material required to mould the panel 16. The spacing panel 16 is moulded from acrylic plastic. The front and rear panels 12, 14 are substantially rectangular and are hinged at respective mounting edges 17, 18 to the spacing panel 16. The front and rear panels 12, 14 also have respective free edges 20, 22 located opposite to the mounting edges 17, 18.

The front panel 12 is moulded from acrylic plastic and a pair of objective lenses 25 are integrally moulded therein. Similarly, a pair of ocular lenses 27 are integrally moulded into acrylic plastic comprising the rear panel 14.

The front and rear panels 12, 14 are hinged to the spacing panel 16 to allow for rotation from the operative configuration shown in FIG. 2, wherein the front and rear panels 12, 14 extend perpendicularly to the spacing panel 16, to the storage configuration shown in FIG. 1 wherein the front and rear panels 12, 14 are folded flat against the spacing panel 16. As can be seen in FIG. 1, the free edges 20, 22 of the front and rear panels 12, 14 respectively, are complementary in shape. The rear panel 14 has a central rebated portion 30 which in use accommodates the user's nose. A complementary projection 32 provided on the front panel 12 is received by the rebated portion 30. This allows the front and rear panels 12, 14 to fold neatly and flatly against the spacing panel 16. In regard to the rebated portion 30, it is pointed out that the binoculars 10 are actually shown upside down in FIG. 2 ie. as can be more easily appreciated from FIG. 3, the rebated portion 30 would rest on the user's nose.

FIG. 1 also shows releasable holding means for releasably supporting the front and rear panels 12, 14 in the operative configuration. The releasable holding means are in the form of block-shaped projections 35, 36, 37, 38. The block-shaped projections 35, 36, 37, 38 each have an inwardly facing engagement surface 39. The front and rear panels 12, 14 have cut-outs 39a complementary in shape to the block-shaped projections, the cut-outs 39a being located at each end of the mounting edges 17, 18. The cut-outs 39a each define an outwardly facing engagement surface 39b which frictionally engages with the engagement surface 39 of the associated block-shaped projection 35, 36, 37, 38. The front and rear panels 12, 14 will be maintained in the operative configuration by this frictional engagement.

The spacing panel 16 also has semi-circular rebated portions 40, 42 to allow handling and manipulation of the front and rear panels 12, 14. Retention means are also provided to releasably hold the binoculars 10 in the storage configuration. As most clearly seen from FIG. 3, a pair of projections 43, 44 is also provided on each end of the free edges 20, 22, one on the front panel 12 and the other on the rear panel 14. Each of these projections is shaped as a quarter segment and each pair together fills one of the semi-circular rebated portions 40, 42. The arcuate edge of each projection 43, 44 frictionally engages with a portion of the arcuate edge of the associated rebated portion 40, 42 to hold the front and rear panels 12, 14 in the storage configuration.

The spacing panel 16 is also provided with niches 45, 46 located at opposite ends of the spacing panel 16 adjacent the front panel 12. The niches 45, 46 locate the knotted ends of a cord or tie 48 (see FIGS. 1 and 2) which in use extends around the user's neck.

FIG. 3 most clearly illustrates the nature of the hinged connections between the front and rear panels 12, 14 and the spacing panel 16. Each of the front and rear panels 12, 14 are pivotably connected to the spacing panel 16 by a pair of hinges 55. Each hinge 55 is made up of an L-shaped portion 57 extending from the front panel 12 or the rear panel 14, the L-shaped portion 57 being received in a cut-out 59 provided in the spacing panel 16. The L-shaped portion 57 is comprised of a first leg 61 extending at right angles to the plane of the front or rear panel 12, 14 and a second leg 63 extending outwardly from the front or rear panel 12, 14 (see FIG. 1 also). At the knee of the L-shaped portion 57, are two cylindrical projections 65, one on each side of the L-shaped portion 57. The two cylindrical projections define a hinge pin.

Each cylindrical projection 65 is received within a channel 67 defined in the spacing member 16. Each channel is U-shaped to reduce stress concentration at the region surrounding the channel. The spacing portion 16 also has increased thickness in the vicinity of each channel 67.

It can be seen from FIG. 1 that the second leg 63 of the L-shaped portion 57 sits flush with the edge of the spacing panel 16 when the binoculars 10 are in the storage configuration. As shown in FIG. 2, in the operative configurations the first leg 61 of the L-shaped portion 57 is substantially flush with the edge of the spacing panel 16.

FIGS. 4 and 5 are part cross-sectional views through the spacing panel 16 at the location of the channel 67. For the purposes of explanation, it is assumed that the cross-section is taken through one of the hinges 55 connecting the front panel 12 to the spacing panel 16. FIGS. 4 and 5 also illustrate the first leg 61 and the second leg 63 of the L-shaped projection 57. It can be seen from the cross-sectional view that the side walls of the channel 67 define a region of reduced internal dimension slightly spaced from the inner side of the spacing panel 16. To assemble the front panel 12 and the spacing panel 16, the cylindrical projection defining part of the hinge pin must be pushed past this region of reduced internal dimension whereupon the cylindrical projection 65 will be held within the channel 67. The front panel 12 is assembled with the spacing panel 16 when the front panel lies substantially flat against the spacing panel 16 as shown in FIG. 5.

Extending further from the second leg 63 of the L-shaped projection 57 is a limit projection 70 extending perpendicularly to the second leg 63 and therefore perpendicularly to the front panel 12. The outer side of the spacing panel 16 at the region of increased thickness also defines a stop member 72. The projection 70 engages with the stop member 72 in the operative configuration of the front panel 12 as shown in FIG. 4. The engagement of the projection 70 and the stop member 72, therefore limits the movement of the front panel 12 away from the spacing panel 16 and thus defines the operative configuration of the front panel 12. In a similar manner, projections 70 and stop members 72 are also provided to define the limit of movement for the rear panel 14. From FIG. 4, it can also be seen that the side surface of the front panel 12 at the mounting edge 18 sits squarely on the facing surface of the spacing panel 16. This provides additional support for the front panel 12 in the operative configuration. A similar arrangement is provided to support the rear panel 14.

The external surfaces of the front panel 12 and the rear panel 14, except the lenses have a frosted finish. This can be achieved by providing a rough surface on the interior of the moulding die. The spacing panel 16 also has a frosted exterior surface, except for a central rectangular region 75 provided on the outer side of the spacing panel 16 opposite to the side on which the front and rear panels 12, 14 are mounted. This rectangular region 75 is smooth to allow advertising material to be adhered thereto.

We claim:

1. An optical device comprising:
   a front support including a first optical means;
   a rear support including a second optical means;
   a spacing means extending between the front support and the rear support;
   the front support and the rear support having respective mounting edges, and being pivotably mounted to the spacing means at their respective mounting edges;
   each of the front support and rear support having a free edge located opposite to the mounting edge, the front support and the rear support being foldable between a storage configuration and an operative configuration in which the first optical means and the second optical means are in substantial alignment, the sum of the maximum width of the front support from its mounting edge to its free edge and the maximum width of the rear support from its mounting edge to its free edge is less than the dimension of the spacing means between the mounting of the front support and the mounting of the rear support such that in the storage configuration, the front support and the rear support lie substantially against the spacing means in a common plane and the free edge of the front support is slightly spaced from the free edge of the rear support, said free edges being complementary in shape.

2. The optical device as claimed in claim 1 wherein the free edge of the rear support includes a rebated portion and the free edge of the front support includes a protrusion complementary to the rebated portion.

3. The optical device as claimed in claim 1 wherein the first optical means comprise a first pair of lenses and the second optical means comprise a second pair of lenses, the spacing means adapted to hold the front support and the rear support at a fixed spacing such that the optical device is operable as Galilean binoculars.

4. The optical device as claimed in claim 3 wherein the spacing means is substantially rigid.

5. The optical device as claimed in claim 3 wherein the spacing means comprises a rectangular panel.

6. The optical device as claimed in claim 1 in which a releasable holding means is associated with each of the front support and the rear support to hold the front support and the rear support in the operative configuration.

7. The optical device as claimed in claim 1 wherein the first optical means is integrally moulded with the front support and the second optical means is integrally moulded with the rear support.

8. An optical device comprising:
   a front support including a first optical means;
   a rear support including a second optical means;
   a spacing means extending between the front support and the rear support;
   the front support and the rear support being pivotably mounted to the spacing means and foldable between a storage configuration and an operative configuration in which the first optical means are in substantial alignment with the second optical means; and
   a releasable holding means associated with each of the front support and the rear support to hold the front support and the rear support in the operative configuration, the front support and the rear support being pivotably mounted to the spacing means about respective hinges, each of the hinges incorporating one of the releasable holding means.

9. The optical device as claimed in claim 8 wherein the releasable holding means comprise a snap fitting.

10. The optical device as claimed in claim 9 wherein each snap fitting comprises a protuberance on the surface of the spacing means engageable with either the front support or rear support as it moves between the storage configuration and the operative configuration.

11. The optical device as claimed in claim 8 further including a limit means associated with each of the front support and the rear support to define the operative configuration thereof.

12. The optical device as claimed in claim 11 wherein each limit means comprises a projection engageable with a stop member in the operative configuration.

13. The optical device as claimed in claim 12 wherein the projection is provided on the front support or the rear support and the stop member is provided on the spacing means.

14. The optical device as claimed in claim 8 wherein the front support and the rear support have respective mounting edges at which they are pivotably mounted to the spacing member, the front support and the rear support comprising panels having a thickness to thereby define side surfaces at the respective mounting edges, the pivotable mounting being such that in the operative configuration, each of the side surfaces abuts a facing planar surface disposed on the spacing means.

15. The optical device as claimed in claim 8 wherein the first optical means is integrally moulded with the front support and the second optical means is integrally moulded with the rear support.

16. An optical device comprising:
   a front support including a first optical means;
   a rear support including a second optical means;
   a spacing means extending between the front support and the rear support;
   the front support and the rear support having respective mounting edges, and being pivotably mounted to the spacing means at their respective mounting edges;
   each of the front support and rear support having a free edge located opposite to the mounting edge, the front support and the rear support being foldable between a storage configuration and an operative configuration in which the first optical means and the second optical means are in substantial alignment;
   wherein the first optical means are integrally molded with the front support and/or the second optical means are integrally molded with the rear support;
   the sum of the maximum width of the front support from its mounting edge to its free edge and the maximum width of the rear support from its mounting edge to its free edge is less than the dimension of the spacing means between the mounting of the front support and the mounting of the rear support such that in the storage configuration, the front support and the rear support lie substantially against the spacing means in a common plane and the free edge of the front support is slightly spaced from the free edge of the rear support, said free edges being complementary in shape.

17. Binoculars comprising:
   a first pair of lenses provided in a front support;
   a second pair of lenses provided in a rear support;
   a spacing means extending between the front support and the rear support;
   the front support and the rear support being pivotably mounted to the spacing means and foldable between a storage configuration and an operative configuration in which the first optical means are in substantial alignment with the second optical means;
   a releasable holding means associated with each of the front support and the rear support to hold the front support and the rear support in the operative configuration, the front support and the rear support being pivotably mounted to the spacing means about respective hinges, each of the hinges incorporating one of the releasable holding means;
   wherein the first pair of lenses is integrally molded with the front support and the second pair of lenses is integrally molded with the rear support.

18. Binoculars as claimed in claim 17 wherein the front support and the rear support together with their lenses are constructed from acrylic plastic.

19. Binoculars as claimed in claim 17 wherein portions of the front support and the rear support not including the lenses, are frosted.

20. Binoculars as claimed in claim 17 wherein the front support and the rear support each comprise a rectangular panel.

21. An optical device comprising:
   a front support including a first optical means;
   a rear support including a second optical means;
   a spacing means extending between the front support and the rear support;
   the front support and the rear support being pivotably mounted to the spacing means and foldable between a storage configuration and an operative configuration in which the first optical means are in substantial alignment with the second optical means;
   a releasable holding means associated with each of the front support and the rear support to hold the front support and the rear support in the operative configuration; and
   a limit means associated with each of the front support and the rear support to define the operative configuration thereof, wherein each limit means comprises a projection engageable with a stop member in the operative configuration, and wherein the projection is provided on the front support or the rear support and the stop member is provided on the spacing means.

* * * * *